Jan. 17, 1967  L. D. BUCHMILLER ET AL  3,299,364

FOLDED TRAVELING WAVE MASER STRUCTURE

Filed Jan. 3, 1964 2 Sheets-Sheet 1

Lyle D. Buchmiller
Robert W. Degrasse
William Pinkney Jones
William A. Peterson
INVENTORS BY Townsend and Townsend
attorneys

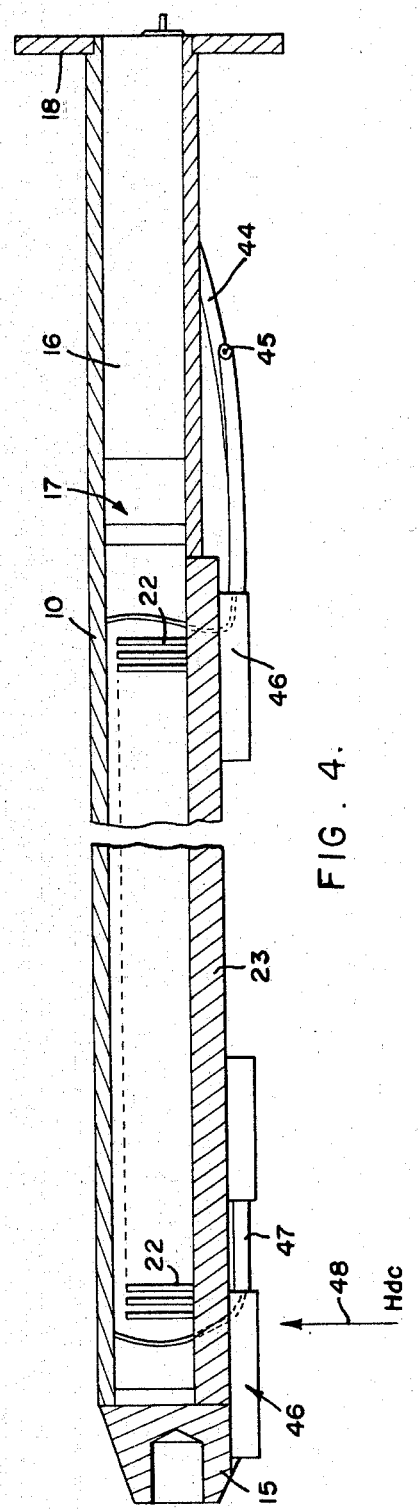
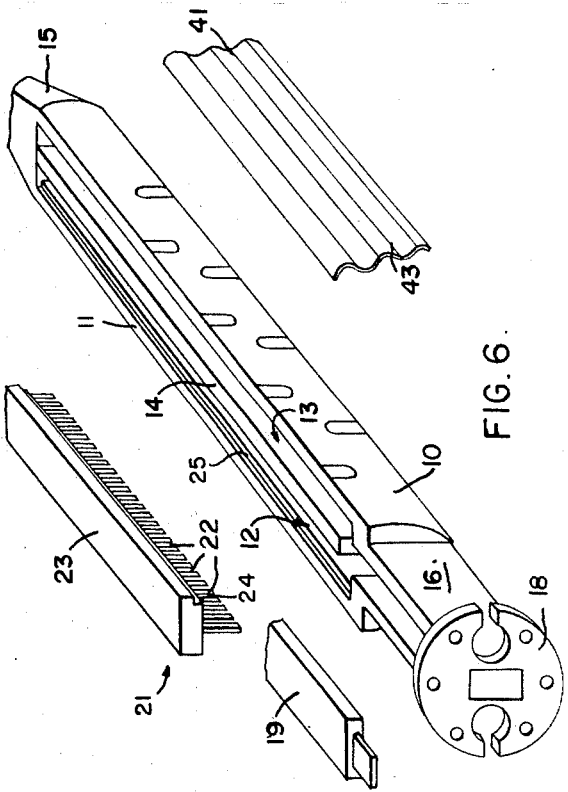

# United States Patent Office 3,299,364
Patented Jan. 17, 1967

3,299,364
FOLDED TRAVELING WAVE MASER STRUCTURE
Lyle D. Buchmiller, Menlo Park, Robert W. De Grasse and William Pickney Jones, Los Altos, and William A. Peterson, Palo Alto, Calif., assignors, by mesne assignments, to the United States of America as represented by the Administrator of the National Aeronautics and Space Administration
Filed Jan. 3, 1964, Ser. No. 336,103
1 Claim. (Cl. 330—4)

The invention described herein was made in the performance of work under a NASA contract and is subject to the provisions of Section 305 of the National Aeronautics and Space Act of 1958, Public Law 85–568 (72 Stat. 435; USC 4257).

This invention relates in general to electromagnetic wave transmission devices and more particularly to devices in which amplification takes place by the stimulated emission of radiation from solid state media in propagating structures. Such devices are now generally termed "traveling wave masers."

The three-level, solid state maser, now well known in the art, employs a microwave pump signal to alter the thermo-equilibrium of a paramagnetic salt or active material in such a manner that an otherwise absorptive medium becomes emissive when stimulated by radiation at a signal frequency. Microwave amplification can be obtained in the propagating structure of a traveling wave maser by stimulated emission radiation from an element of active material. Efficient coupling of the microwave energy to the active material is obtained by slowing the velocity of propagation of the signal wave over an interval coextensive with the active material. The active material produces an equivalent negative resistance in the slow-wave structure and a propagating wave having an exponentially increasing amplitude is obtained. Traveling wave masers are described in U.S. Patent No. 3,004,-225 to R. W. De Grasse et al. and US Patent No. 3,076,-148 to E. O. Schulz-Du Bois.

Broadly stated, the present invention, to be described in greater detail below, is directed to a traveling wave maser which includes at least one pair of waveguides in which a signal wave is amplified by stimulated emission of an active material contained therein. The waveguides are arranged side by side with a common separating wall and are coupled together for coupling the wave being amplified from one waveguide into the other. Additionally, in accordance with the present invention, a resilient member is provided in each of the waveguides adjacent the surface of the common dividing wall for holding the active material in each of the waveguides against the slow wave structures therein. These resilient members are thin metallic spring strips provided with a plurality of corrugations across the width thereof, each of the corrugations extending the entire length of the resilient member.

In accordance with the present invention, the traveling wave maser is foreshortened to approximately half its normal length by providing a pair of traveling wave waveguides side by side and separated by a common wall. The signal to be amplified is coupled into one end of the first of the waveguides and travels the length thereof. At the opposite end of the first waveguide, the signal is coupled into the adjacent end of the second waveguide in which it travels back towards the end of the second waveguide adjacent the input end of the first waveguide.

This folded traveling wave maser can effectively produce the same amount of amplification of the input signal in half the length required by one continuous in-line maser structure. Additionally, by this structure the input coupling for the signal wave to be amplified and the output coupling for the amplified signal wave are disposed adjacent one another for convenience of installation of the maser. Also, since the maser must be cooled to a low temperature such as, for example, the temperature of liquid helium, the traveling wave maser according to the present invention permits conduction cooling of the maser elements from one end and the heat conduction path is only half of what it would be if the maser were in a continuous straight line. Furthermore, by utilizing a single common wall between the side by side waveguides a good heat conduction path is provided to both waveguides eliminating temperature gradients between the waveguides, and the size of the surrounding magnet assembly which provides a unidirectional field to the maser is reduced to a minimum.

The corrugated resilient members not only provide a good heat conduction path from the common separating wall to the elements of active material but also force these elements against the slow wave structure while permitting differential expansion and contraction of the slow wave structure and the active elements over the temperature range from ambient temperature to the operating temperature level. The corrugations in the resilient member are in a direction substantially normal to the direction in which the periodic variations in the slow wave structure occur and therefore do not serve to disrupt the passband of the traveling wave maser propagating structure.

Additionally, in accordance with the present invention the magnetic field strength is varied along the length of the plurality of side by side waveguides thereby to provide an effective stagger tuning of the propagating structure.

Other objects of the present invention will become apparent upon reading the following specification and referring to the accompanying drawings in which similar characters of reference represent corresponding parts in each of the several views.

In the drawings:

FIG. 4 is a longitudinal sectional view of the structure shown in FIG. 3 taken along line 4—4 in the direction of the arrows;

FIG. 6 is an exploded perspective view showing the elements of one waveguide of the traveling wave structure.

Figure 1:
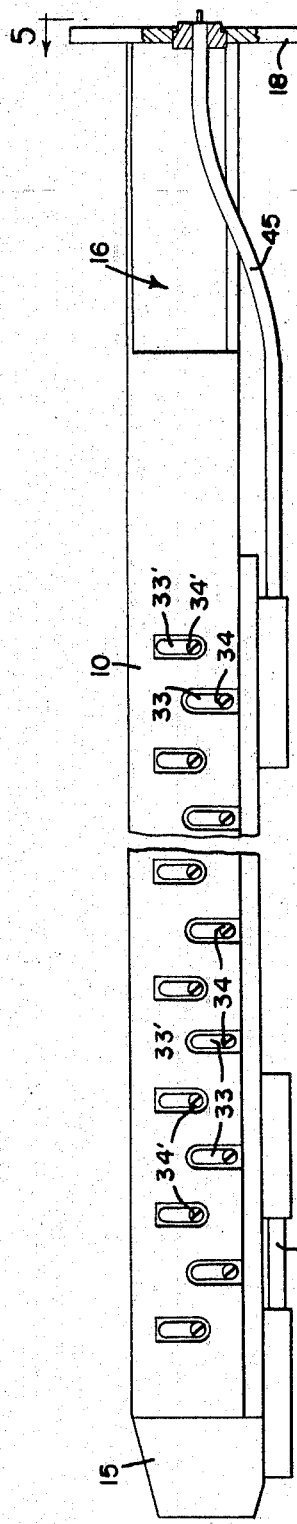
FIG. 1 is a side elevational view, partially broken away, of a traveling wave maser in accordance with the present invention.
Figure 2:
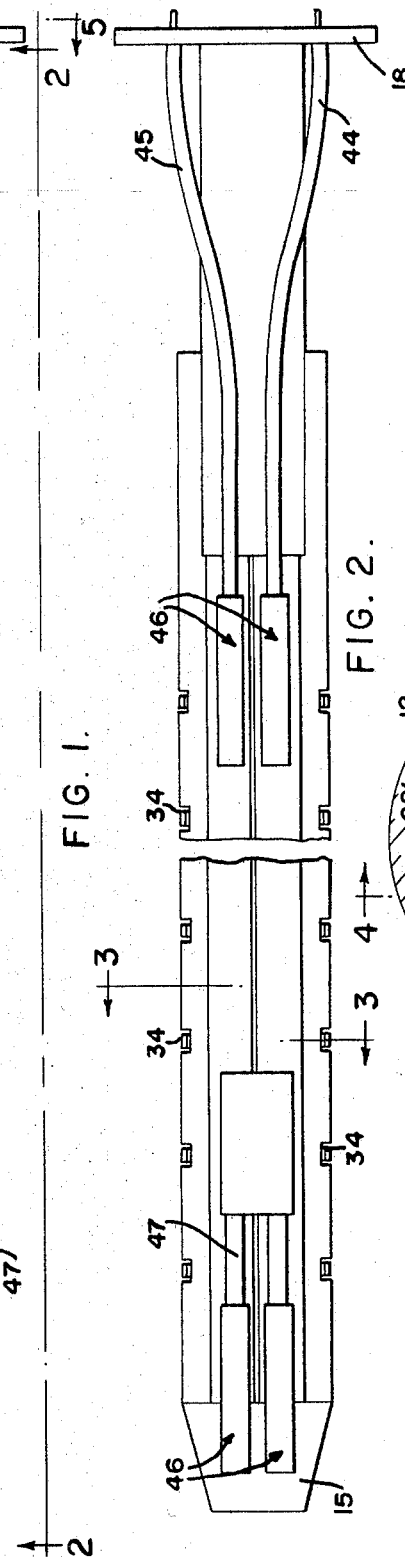
FIG. 2 is a bottom view of the structure shown in FIG. 1 taken along line 2—2 in the direction of the arrows.
Figure 5:
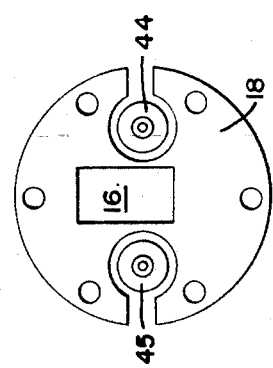
FIG. 5 is an end view of the structure shown in FIG. 1 taken along line 5—5 in the direction of the arrows.

Referring now to the drawing, there is shown a traveling wave maser in accordance with the present invention including a main body structure 10 made of high conductivity material such as, for example, copper. The body is a semi-cylindrical rod cut longitudinally thereof to provide a flat mounting surface 11. Additionally, a pair of longitudinal slots 12 and 13 (see FIGS. 3 and 6) are milled in the body 10 to provide a pair of longitudinally extending, side-by-side rectangular waveguides 12 and 13 extending the length of the body 10 and separated by a thin common dividing wall 14. These waveguides 12 and 13 each have a pair of narrow walls and a pair of wide walls one of which is the dividing wall 14.

One end of the main body 10 is provided with a waveguide short 15 closing one end of the waveguides 12 and 13.

At the opposite end of the main body 10 from the waveguide short 15 is provided a common pump signal input waveguide 16 having a flange 18 at one end thereof for attachment to the pump source (not shown) and communicating with the waveguides 12 and 13 through a transition 17 (see FIG. 4). A cover plate 19 covers the top of the input waveguide 16 to enclose the waveguide.

The slow wave structure within each of the maser waveguides includes a comb-like structure 21 (see FIG. 6) which is provided with a coplanar array of equally spaced apart conductive fingers 22 projecting from a metallic base block 23. Typically, the array of fingers 22 and the block 23 are machined from a common block of metal such as, for example, copper. The base block 23 is provided with a stepped cut-out 24 adapted to rest against one of the corners of the free end of the common dividing wall 14 and a stepped recess 25 is provided the length of the slot forming the waveguides 12 and 13 in each of the outside walls to receive the base block 23. The stepped cut-out 24 and the recess 25 are so dimensioned as to properly position the fingers 22 of the comb-like structure 21 within the waveguides 12 and 13 substantially midway between the wide waveguide walls and orthogonally disposed with respect to the longitudinal axes of the waveguides 12 and 13.

Figure 3:
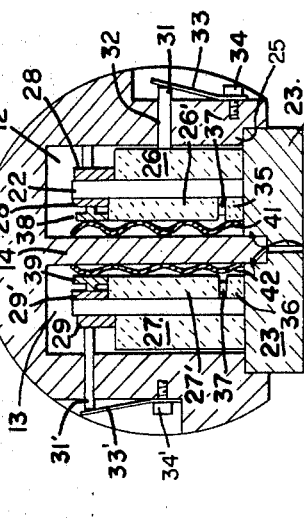
FIG. 3 is an enlarged cross-sectional view of the structure shown in FIG. 2, taken along line 3—3 in the direction of the arrows.

Referring now particularly to FIG. 3 positioned adjacent the outer side of the comb fingers 21 in the waveguides 12 and 13 are elements 26 and 27, respectively of active or negative temperature material. Additionally, tip loading material such as, for example, sintered alumina rods 28 and 29 are positioned above the elements 26 and 27 against the tips of the comb fingers 22. Various paramagnetic salts are suitable for use as the active or negative temperature material of maser devices of the general type described herein. A typical example of such a material is aluminum oxide which has an impurity content of approximately one-thirtieth of one percent of trivalent chromium referred to as "ruby" material. Any material capable of amplifying a signal wave by stimulated emission of wave energy can be used, and such materials are referred to herein as the active material or the maser material.

The active elements 26 and 27 are compressed against the comb fingers 22 by a plurality of dielectric rods 31 which are mounted in bores 32 spaced along the length of the outward waveguide wall in a row. These rods 31 are forced against the active elements 26 and 27 by one end of leaf springs 33 the other end of which is secured to the main body 10 by screws 34.

Loading elements 28 and 29 of, for example, alumina are positioned adjacent the tips of the fingers 22 on the same sides thereof as the active elements 26 and 27. These loading elements are held against the fingers 22 by dielectric rods 31', leaf springs 33' and screws 34' in the same manner as the active elements 26 and 27.

On the opposite side of the fingers 22 from the elements 26 and 27 in waveguides 12 and 13 are positioned active elements 26' and 27' respectively. These elements 26' and 27' are isolated from the base block 23 by ceramic spacers 35 and 36 respectively, extending the entire length of the slow-wave structure. Mounted on the spacers adjacent the active elements are periodically spaced apart flat disks 37 of gyromagnetic material such as, for example, yttrium-iron-garnet.

Loading elements 28' and 29' of, for example, alumina are also positioned adjacent the tips of the fingers 22 on the same sides thereof as the active elements 26' and 27', and these loading elements 28' and 29' are spaced from the common dividing wall by dielectric spacers 38 and 39.

The active elements 26' and 27', isolator spacers 35 and 36 and loading elements 28' and 29' in the appropriate waveguides 12 and 13 are held against the fingers 22 by resilient members 41 and 42 respectively of, for example, 3 mil thick beryllium copper extending the length of the slow wave structure. Each of the resilient members 41 and 42 is provided with a plurality of corrugations 43 spaced across the width thereof, and each of these corrugations extends substantially entirely the length of the member.

As shown in FIGS. 1, 2, 4 and 5 an input coaxial line 44 and an output coaxial line 45 extend from the waveguide flange 18 to adjacent the closest end of the slow-wave structures in waveguides 12 and 13 respectively. The ends of these coaxial lines 44 and 45 are provided with lead-in or lead-out coupling assemblies 46.

A similar coaxial line lead-out coupling assembly 46 (see FIGS. 2 and 4) is provided at the end of the first waveguide 12 adjacent the waveguide short 15, and a similar coaxial lead-in coupling assembly 46 is provided at that same end of waveguide 13 for coupling an amplified signal from the end of waveguide 12 adjacent the short 15 through a coaxial line 47 to the end of waveguide 13 adjacent the short 15. A matching assembly is provided in the coaxial 47 to adjust the coupling between the waveguides 12 and 13.

The active material and gyromagnetic material are magnetically biased by means of a common uniform magnetic field $H_{dc}$ (indicated by arrow 48) in FIG. 4 directed parallel to the fingers 22. The source of this field is not shown but can be supplied in any convenient manner such as, for example, by an electromagnet or a permanent magnet.

According to another aspect of the present invention the strength of the magnetic field $H_{dc}$ can be varied along the length of the side by side waveguides effectively to stagger tune the propagating structure. Thus, with a plurality of side by side waveguides a variation in the magnetic field at one position along the length of the magnet structure produces a plurality of such variations along the effective length of the traveling wave structure.

The traveling wave maser is conduction cooled to a temperature of approximately 4.3° K. or below by a refrigeration system in contact with the flange 18. It may also be bath cooled in a dewar.

Obviously, coupling arrangements other than the coaxial line 47 can be utilized to couple the signal from one waveguide to the other.

The traveling wave maser described above is assembled by first securing the base block 23 to the main body 10 such as, for example, by solder. Next, with the waveguide short 15 removed, the active elements 26 and 27 and tip loading elements 28 and 29 are slid into the waveguides 12 and 13. A flat metallic strip is attached to one end of each of the resilient members 41 and 42, and these strips are slid into the waveguides 12 and 13 through the pump power input waveguide 16 to the position ultimately occupied by the resilient members 41 and 42. Then the isolator spacers 35 and 36, the active elements 26' and 27', the tip loading elements 28' and 29' and the dielectric spacers 38 and 39 are slid into place in the waveguides 12 and 13 through the shorted end of the waveguide. Then, by holding these elements in place and pulling the metallic strips attached to the resilient members 41 and 42 through the waveguides 12 and 13 the resilient members are properly positioned so as to force the active elements 26' and 27' and leading elements 28' and 29' against the fingers 22. The metallic strips are then cut from the resilient members and the waveguide short secured in place such as, for example, by screws.

In operation of the traveling wave maser in accordance with the present invention, a pump signal is directed into the waveguides 12 and 13 through the input waveguide 16. A signal to be amplified is directed by means of the input coax 44 into the waveguide 12 in which the signal is amplified by stimulated emission of radiation as it travels the length of the waveguide. At the end of the waveguide 12 the amplified signal is coupled through coaxial line 47 into waveguides 13 and is again amplified as it travels the length of the waveguide. The output signal is brought out through the outward coaxial line 45. Obviously, two, three, four or more waveguides may be placed side by side and may be subjected to the same or several different fields.

By way of example, an S-band traveling wave maser built in accordance with the present invention has a center frequency of 2300 mc. plus or minus 5% and an instantaneous band width of 15 mc. minimum at 3 db power points. The maser at the input flange has a noise temperature of 12° K. and a gain stability of less than plus or minus 0.1 db in 10 hours and utilizes a pump power of 35–75 milliwatts at a frequency of about 12 kmc. The maser itself weights 3.5 pounds.

Although the foregoing invention has been described in some detail by way of illustration and example for purposes of clarity of understanding, it is understood that certain changes and modifications may be practiced within the spirit of the invention as limited only by the scope of the appended claim.

It is claimed:

A traveling wave maser structure which comprises:
(a) a body of conductive material having a pair of parallel waveguides therein; (1) said waveguides being separated by a common wall;
(b) a waveguide short on one end of said body for closing one end of said waveguide and contributing to reversing a signal traveling down one waveguide and returning via the other waveguide;
(c) a common pump signal input waveguide at the other end of said body which is cryogenically cooled to thereby cool each of said waveguides and structure therein;
(d) means adjacent said waveguide short for coupling an amplified signal from said one waveguide to said other waveguide;
(e) a tip loaded slow-wave comb structure disposed within each of said waveguides;
(f) active material on each side of said comb structure for amplifying a signal wave imposed on each comb structure;
(g) spring means for holding said active material against said comb structure in each waveguide,
  (1) said spring means including a corrugated metallic resilient member substantially coextensive with each comb structure and being disposed adjacent to and in contacting engagement with the common wall to thereby provide a heat conduction path between said waveguides; and
(h) means for sending a signal down said one waveguide and extracting an amplified signal returning via said other waveguide.

References Cited by the Examiner

UNITED STATES PATENTS 3,214,701  10/1965  Chen et al. _____ 330—4

FOREIGN PATENTS 1,277,321  10/1961  France.

ROY LAKE, *Primary Examiner.*

D. R. HOSTETTER, *Assistant Examiner.*